United States Patent [19]
Dong

[11] Patent Number: 5,503,739
[45] Date of Patent: Apr. 2, 1996

[54] HEAT DISSIPATING DEVICE FOR WATER PURIFIER'S THERMOELEMENT

[75] Inventor: Joung W. Dong, Seoul, Rep. of Korea

[73] Assignee: Chung Ho NAIS Incorporation, Seoul, Rep. of Korea

[21] Appl. No.: 526,366

[22] Filed: Sep. 11, 1995

[51] Int. Cl.$^6$ .............................. C02F 1/44; B01D 61/00; B01D 61/06
[52] U.S. Cl. .................... 210/186; 210/321.66; 210/650
[58] Field of Search .............................. 210/186, 321.66, 210/650, 321.6

[56] References Cited

U.S. PATENT DOCUMENTS

| | | | |
|---|---|---|---|
| 3,809,241 | 5/1974 | Alvine | 210/186 |
| 4,498,982 | 2/1985 | Skinner | 210/186 |

Primary Examiner—Cynthia L. Nessler
Attorney, Agent, or Firm—Harrison & Egbert

[57] ABSTRACT

An improved heat dissipating device for water purifier's thermoelement is disclosed. The device selectively uses either the fresh water or waste water of a membrane as refrigerant to absorb and dissipate heat of the thermoelement's hot junction. The above device is connected to a waste water drain conduit of the membrane and to a fresh water bypass conduit, thereby being selectively supplied with either the waste water of the membrane or the fresh water as the refrigerant. The waste water drain conduit has a flow control valve for controlling the amount of waste water to be supplied for the heat dissipating device. The fresh water bypass conduit has a solenoid valve for making the fresh water be directly supplied for the heat dissipating device when the fresh water is not supplied for the water purifying system as the purified water tank has been filled with the purified water.

5 Claims, 3 Drawing Sheets

HEAT DISSIPATING DEVICE FOR WATER PURIFIER'S THERMOELEMENT

BACKGROUND OF THE INVENTION

1. Field of the Invention

The present invention relates in general to heat dissipating devices for water purifier's thermoelement cooling the purified water and, more particularly, to a structural improvement in such heat dissipating devices for effectively dissipating heat of the thermoelement's hot junction using either fresh water or waste water of the water purifier as a refrigerant and thereby rapidly cooling the purified water and improving the water cooling effect of the thermoelement while neither wasting electric energy nor generating operational noise.

2. Description of the Prior art

Most conventional water purifiers have no means for cooling the purified water before delivering the purified water for users to drink. Therefore, the conventional water purifies having no water cooling means can not help delivering tepid purified water for the users to drink particularly in the summer season. As well known to people, the cold purified water is fit to drink particularly in the summer season. However, the conventional water purifiers having no water cooling means can not provide cold purified water for the users but merely provides tepid water for the users. In order to cool the purified water delivered from such water purifiers and thereby making the purified water be fit to drink in the summer season, there is no way in the prior art except for either preserving the purified water in a freezing or cooling chamber of a refrigerator for a time or adding ices into the purified water. However, to preserve the purified water in a refrigerator for a time or to use the ices for providing the cold purified water for the users is problematic in that it not only wastes energy, but also annoys the users.

In an effort to solve the above problems caused by the conventional water purifiers having no water cooling means, this applicant proposed a water cooling device for water purifier in Korean patent Appln. No. 94-25892.

In the above Korean patent application, a thermoelement having N- and P-type semiconductors is mounted to the outer bottom of a purified water tank of a water purifier. The bottom of the hot junction of the thermoelement is provided with a heat dissipating panel for effectively dissipating heat of the hot junction to the surroundings. Additionally, a motor fan is placed under the dissipating panel of the thermoelement for promoting the heat dissipation of the panel. Meanwhile, the cold junction of the thermoelement is thermally coupled to the purified water tank and absorbs the heat from the purified water in the tank. The heat absorbed by the cold junction in turn is dissipated to the surroundings from the hot junction having the dissipating panel and thereby cooling the purified water in the water tank before delivering the water for users to drink. In this case, the motor fan provides air current for the dissipating panel to promote heat dissipation of the panel and thereby improving the water cooling efficiency of the thermoelement and rapidly cooling the purified water.

However, use of the motor fan for promoting the heat dissipation of the dissipating panel is problematic in that the motor fan not only increases the total weight of the water purifier, but also wastes electric energy to increase the operating cost of the water purifier. Furthermore, the motor fan generates operational noise.

SUMMARY OF THE INVENTION

It is, therefore, an object of the present invention to provide a heat dissipating device for water purifier's thermoelement in which the above problems can be overcome and which remarkably cuts down the manufacturing cost and reduces energy consumption and operational noise of the heat dissipating device.

In order to accomplish the above object, the present invention provides a heat dissipating device for water purifier's thermoelement selectively using either the fresh water or waste water coming out of a membrane of a water purifying system as refrigerant to absorb and dissipate heat of the thermoelement's hot junction. The heat dissipating device is mounted on the bottom of the thermoelement. The above device is connected not only to a waste water drain conduit extending from the membrane, but also to a fresh water bypass conduit and thereby being selectively supplied with either the waste water coming out of the membrane or the fresh water as the refrigerant. The waste water drain conduit has a flow control valve for controlling the amount of waste water to be supplied for the heat dissipating device as the refrigerant. The fresh water bypass conduit has a solenoid valve for making the fresh water be directly supplied for the heat dissipating device as the refrigerant when the fresh water is not supplied for the water purifying system as the purified water tank has been filled with the purified water.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
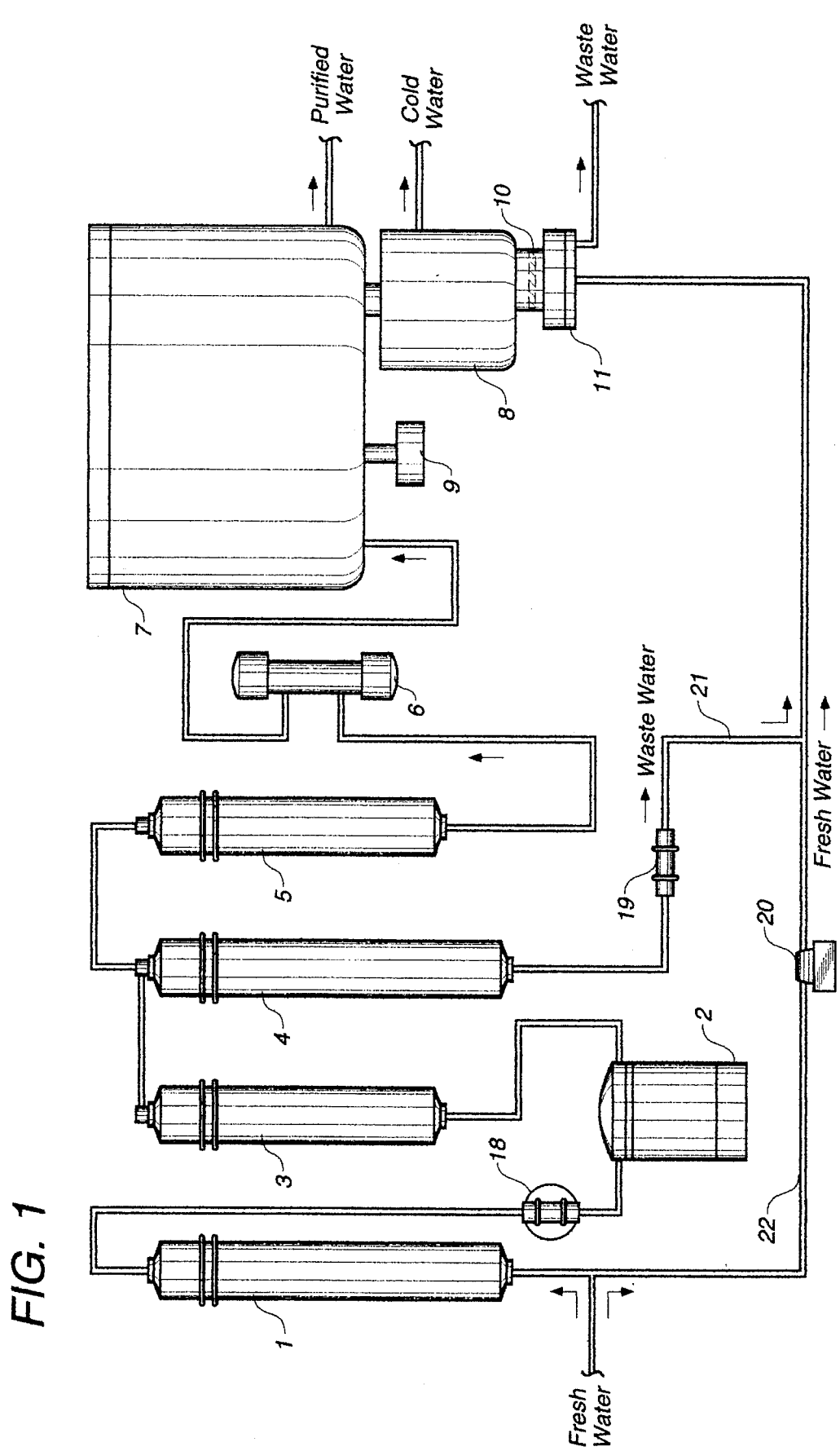
FIG. 1 is a view showing the structure of a water purifier provided with a heat dissipating device of the present invention.

With reference to the drawings, FIG. 1 is a view showing the structure of a water purifier provided with a heat dissipating device of the present invention. As shown in FIG. 1, the fresh water such as city water or underground water is primarily filtered by a settling filter 1 which filters off impurities. The fresh water coming out of the settling filter 1 in turn flows to a booster pump 2 wherein the water pressure is increased. The high pressure water coming out of the pump 2 in turn passes through a first carbon filter 3 wherein the water is secondarily filtered. The secondarily filtered water of the carbon filter 3 in turn flows to a membrane 4.

In the membrane 4, the secondarily filtered water partially passes through the membrane 4 and thereby being thirdly filtered and becoming clear water. This clear water coming out of the membrane 4 in turn flows to a second carbon filter 5. In the second carbon filter 5, the water is fourthly filtered and in turn flows to an ultraviolet (U/V) filter 6 wherein the water will be fifthly or finally filtered. The finally filtered water or completely purified water is collected in a purified water tank 7.

As the tank 7 is provided with a water level controller 9, the water level in the tank 7 is automatically controlled. That is, the tank 7 is exclusively filled up with purified water when there is a deficiency of the purified water in the tank 7. However, the purified water is not supplied to the tank 7 when the tank 7 has been filled with the purified water.

The purified water of the tank 7 may be either directly delivered for users to drink or flow into a cold water tank 8. In the tank 8, the purified water is cooled and in turn delivered for the users to drink.

Provided on the outer bottom of the cold water tank 8 is a conventional thermoelement 10 including a hot junction and a cold junction. The cold junction of the thermoelement 10 which forms the upper part of the thermoelement 10 is thermally coupled to the bottom of the cold water tank 8 and thereby absorbs the heat from the tank 8 charged with the purified water. Meanwhile, the hot junction which forms the lower part of the thermoelement 10 is provided with heat exchanging means.

Figure 2:
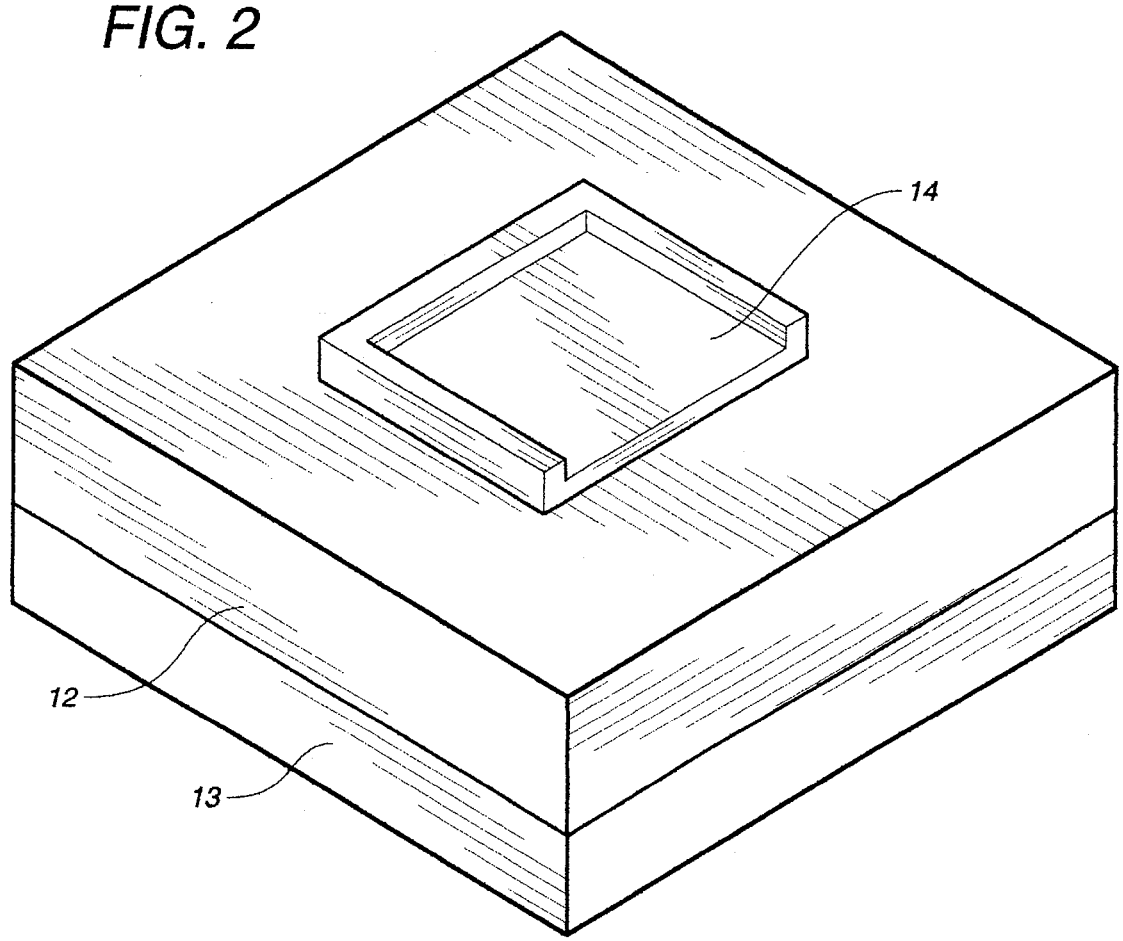
FIG. 2 is a perspective view of the heat dissipating device in accordance with an embodiment of the present invention.
Figure 3:
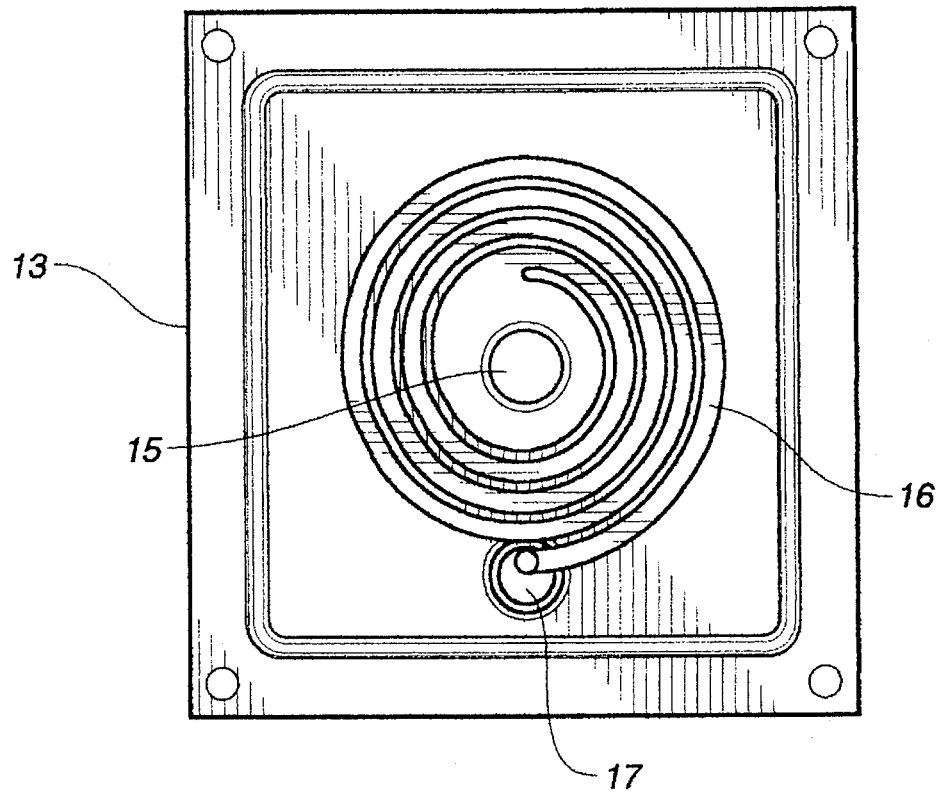
FIG. 3 is a plan view of a lower body of the heat dissipating device of FIG. 2.
Figure 4:
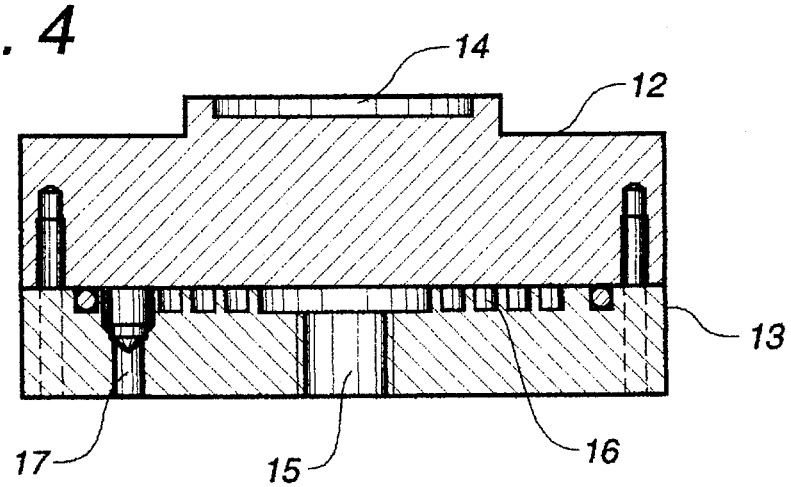
FIG. 4 is a sectional view of the heat dissipating device of FIG. 2.

In the present invention, the heat exchanging means provided on the bottom of the hot junction of the thermoelement 10 comprises a heat dissipating device 11 shown in FIGS. 2 to 4.

As shown in FIG. 2, the heat dissipating device 11 includes an upper body 12 and a lower body 13. The top surface of the upper body 12 is provided with a seat 14 for seating the thermoelement 10 therein.

As shown in FIG. 3, the lower body 13 of the device 11 is provided with a refrigerant inlet hole 15 which is vertically perforated in the center of the lower body 13. A refrigerant passage 16 is formed about the refrigerant inlet hole 15 and in turn extends to a refrigerant outlet hole 17 which is vertically perforated in the lower body 13. The refrigerant passage 16 communicates with the refrigerant inlet and outlet holes 15 and 17.

Please noted that it is most preferred to form the refrigerant passage 16 into a scroll-type passage as best seen in FIG. 3 as the scroll-type passage achieves superior heat exchanging efficiency of the heat dissipating device 11 as will be described later herein. Of course, it should be understood that the refrigerant passage 16 may have another configuration in accordance with designing conditions.

The scroll-type refrigerant passage 16 forms a close system when the lower body 13 having the passage 16 is water-tightly covered with the upper body 12. Therefore, while the refrigerant flows in the passage 16 from the inlet hole 15 to the outlet hole 17, the refrigerant is not leaked to the outside of the heat dissipating device 11 but totally used for heat exchanging in the device 11.

When the refrigerant passage 16 is a linear passage, the heat dissipating device 11 will achieve inferior heat exchanging efficiency. However, as the aforementioned scroll-type passage 16 of FIG. 3 not only lengthens the contact time between the refrigerant in the passage 16 and the upper body of the device 11 but also increases the contact area between them, the passage 16 activates the heat exchanging operation of the device 11. The device 11 thus rapidly dissipates the heat of the thermoelement 10 and substantially improves the water cooling effect of the thermoelement 10.

In the water purifier, the water including the impurities and dregs filtered off by the membrane 4 will be treated as waste water. In the prior art, such waste water has been simply discarded as sewage.

However, the present invention preferably uses the above waste water as refrigerant for the heat dissipating device 11. In the water purifier, the membrane 4 generates the substantial amount of waste water which comprises the most part of the secondarily filtered water supplied to the membrane 4 from the first carbon filter 3. This invention does not discard the waste water as sewage but uses the waste water as refrigerant for the heat dissipating device 11 and thereby remarkably cuts down the cost for cooling the purified water of the cold water tank 8.

When the purified water tank 7 has been filled with purified water, no fresh water is treated by the water purifying system of the water purifier. In this case, the membrane 4 generates no waste water which will be used as the refrigerant for the device 11. In this case, the present invention uses the fresh water instead of the waste water as the refrigerant for the device 11. As the heat dissipating device 11 of this invention may selectively use either the fresh water or the waste water as its refrigerant, this device provides convenience to the users.

As the water purifier of this invention uses no motor fan for dissipating the heat from the thermoelement 10 to the surroundings, the water purifier reduces electric energy consumption as well as operational noise.

Turning to FIG. 1, a first solenoid valve 18 is mounted on the conduit extending between the settling filter 1 and the booster pump 2, while a flow control valve 19 is mounted on a waste water drain conduit 21. The above conduit 21 extends from the membrane 4 and in turn joins a fresh water bypass conduit 22. A second solenoid valve 20 is mounted on the bypass conduit 22 before the point at which the drain conduit 21 joins the bypass conduit 22.

The first solenoid valve 18 controls the pipe line to stop supplying the fresh water for the water purifying system of the water purifier and thereby prevents waste of fresh water when the water tank 7 has been filled with the purified water. The flow control valve 19 controls the amount of waste water to be supplied for the heat dissipating device 11. The second solenoid valve 20 controls the pipe line to directly supply the fresh water for the heat dissipating device 11 when the fresh water is not supplied for the water purifying system of the water purifier as the water tank 7 has been filled with the purified water.

As described above, the heat dissipating device for water purifier's thermoelement of this invention effectively dissipates heat from the hot junction of the thermoelement and cools the purified water before delivering the purified water for users to drink. While dissipating the heat of the thermoelement, the instant device selectively uses either the waste water or the fresh water of the water purifier as refrigerant instead of using a conventional motor fan which not only consumes electric power, but also generates operational noise. As the heat dissipating device of this invention uses no motor fan, the device not only simplifies the construction of the water purifier, but also achieves lightness of the water purifier. Another advantage of the above device is resided in that the device substantially reduces the manufacturing cost, wastes no energy and completely removes the operational noise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a water purifier comprising a water purifying system including a membrane and adapted for filtering fresh water to prepare purified water, a purified water tank for containing the purified water, a cold water tank with a thermoelement for selectively cooling the purified water prior to delivering the purified water for people to drink, the thermoelement having a hot junction, and a heat dissipating device mounted on the bottom of the thermoelement and providing means for dissipating heat of the hot junction of the thermoelement, the improvement comprising:

said heat dissipating device including heat exchanging means for selectively using either the fresh water or waste water coming out of said membrane as refrigerant to absorb and dissipate the heat of the hot junction of the thermoelement.

2. The water purifier according to claim 1, wherein said heat exchanging means comprises upper and lower bodies, said lower body including:

a refrigerant inlet hole vertically perforated in the center of said lower body;

a refrigerant passage formed on the top surface of said lower body about the refrigerant inlet hole and connected to the inlet hole at its inside end; and a refrigerant outlet hole vertically perforated in the lower body and connected to the outside end of said refrigerant passage.

3. The water purifier according to claim 2, wherein said refrigerant inlet hole is connected not only to a waste water drain conduit extending from the membrane, but also to a fresh water bypass conduit and thereby being selectively supplied with either the waste water coming out of said membrane or the fresh water as the refrigerant.

4. The water purifier according to claim 3, wherein said waste water drain conduit is provided with a flow control valve for controlling the amount of waste water to be supplied for the heat dissipating device as the refrigerant.

5. The water purifier according to claim 3, wherein said fresh water bypass conduit is provided with a solenoid valve, the solenoid valve providing means for directly supplying the fresh water to the heat dissipating device as the refrigerant when said purified water tank is full.

\* \* \* \* \*